United States Patent [19]

Cowman

[11] 4,332,088

[45] Jun. 1, 1982

[54] STUD LOCATER

[76] Inventor: Joel V. Cowman, 475 E. Lakeshore Dr., Sunrise Beach, Tex. 78643

[21] Appl. No.: 207,715

[22] Filed: Nov. 17, 1980

[51] Int. Cl.³ .............................................. G01B 5/18
[52] U.S. Cl. ................................................ 33/169 R
[58] Field of Search .............. 33/169 R, 169 B, 174 R

[56] References Cited

U.S. PATENT DOCUMENTS

| | | | |
|---|---|---|---|
| 745,357 | 12/1903 | Lanham | 33/174 R |
| 1,674,875 | 6/1928 | Schaurte | 33/199 R |
| 2,308,146 | 1/1943 | Baker | 33/126 |
| 2,992,488 | 7/1961 | Berrett | 33/169 R |
| 3,274,692 | 9/1966 | Morrison | 33/169 B |

FOREIGN PATENT DOCUMENTS 864907 4/1961 United Kingdom ............. 33/174 R

*Primary Examiner*—Harry N. Haroian
*Attorney, Agent, or Firm*—Roylance, Abrams, Berdo & Farley

[57] ABSTRACT

An apparatus for accurately locating a stud concealed behind wallboard or the like includes a calibrated plate with an opening and an L-shaped probe having a coupling member on one end. A test hole is made in the wall and the probe is inserted through the hole until the coupling member goes into the plate opening. The probe is then swung through an angle from vertical until it strikes the stud. The plate has indicia to indicate distance to the stud, solving the right triangle of which the probe is the hypoteneuse.

9 Claims, 7 Drawing Figures

STUD LOCATER

This invention relates to an apparatus for locating a structural member within a wall and, in particular, for locating the center of a member such as a wall stud.

BACKGROUND OF THE INVENTION

It is often desirable to determine the location of a wooden member in a wall so that a fastener, such as a screw or nail, can be driven into the wall and, especially, directly into the member to support a shelf, picture or other article which might be too heavy to be supportable by the wall area between such members.

Vertical support members, usually called studs, can be approximately located by using magnetic devices which respond to the presence of the nails normally used to fasten materials such as gypsum wallboard or panelling to the studs. Unfortunately, the nails are not known to be at or very near to the stud center so that, even if one finds a nail magnetically, it is quite difficult to tell how far the stud center is from that nail and in which direction. Also, it is often rather difficult to determine the location of the nail accurately through the tape, spackle and paint which is used to finish the wallboard and seams.

It has therefore been determined that the most reliable and accurate technique for locating a stud involves putting something through a test hole in the wallboard which is capable of "feeling" the stud and which involves some sort of measuring technique. Examples of such devices, used in locating studs and various other items which are concealed from view, are found in the following U.S. patents.

U.S. Pat. No. 745,357, Lanham;
U.S. Pat. No. 1,718,003, Prsha;
U.S. Pat. No. 1,811,945, Lange;
U.S. Pat. No. 2,480,725, Gilbert;
U.S. Pat. No. 2,600,722, Atkinson;
U.S. Pat. No. 2,992,488, Berrett;
U.S. Pat. No. 3,048,925, Klaus.

Unfortunately, these devices generally require making a test hole which is rather large, an obviously undesirable requirement, or else they are not particularly accurate.

BRIEF DESCRIPTION OF THE INVENTION

Accordingly, it is an object of the present invention to provide an improved device for locating a stud such that the center thereof can be accurately determined.

A further object is to provide such a device which requires making a very small and inconspicuous test hole.

Briefly described, the invention includes an apparatus for measuring and displaying the distance between a concealed structural member and a hole through a planar panel adjacent to and concealing the structural member comprising a surface plate having an opening therethrough; an elongated, generally L-shaped probe member having one leg significantly longer than the other leg and a diameter smaller than the hole, said longer leg being insertable through said opening in said surface plate and through the hole and being turnable until the shorter leg is substantially coaxial with the hole and said longer leg is generally parallel with the panel; a coupling member attached to the distal end of said shorter leg, said coupling member being shaped to be received in the opening in said surface plate; and indicia on said surface plate for indicating the amount of angular sweep of said longer leg as said probe is rotated about the axis of said shorter leg from a starting position to a position in which the distal end of said longer leg contacts said structural member.

In order that the manner in which the foregoing and other objects are attained in accordance with the invention can be understood in detail, particularly advantageous embodiments thereof will be described with reference to the accompanying drawings, which form a part of this specification, and wherein.

Figure 1:
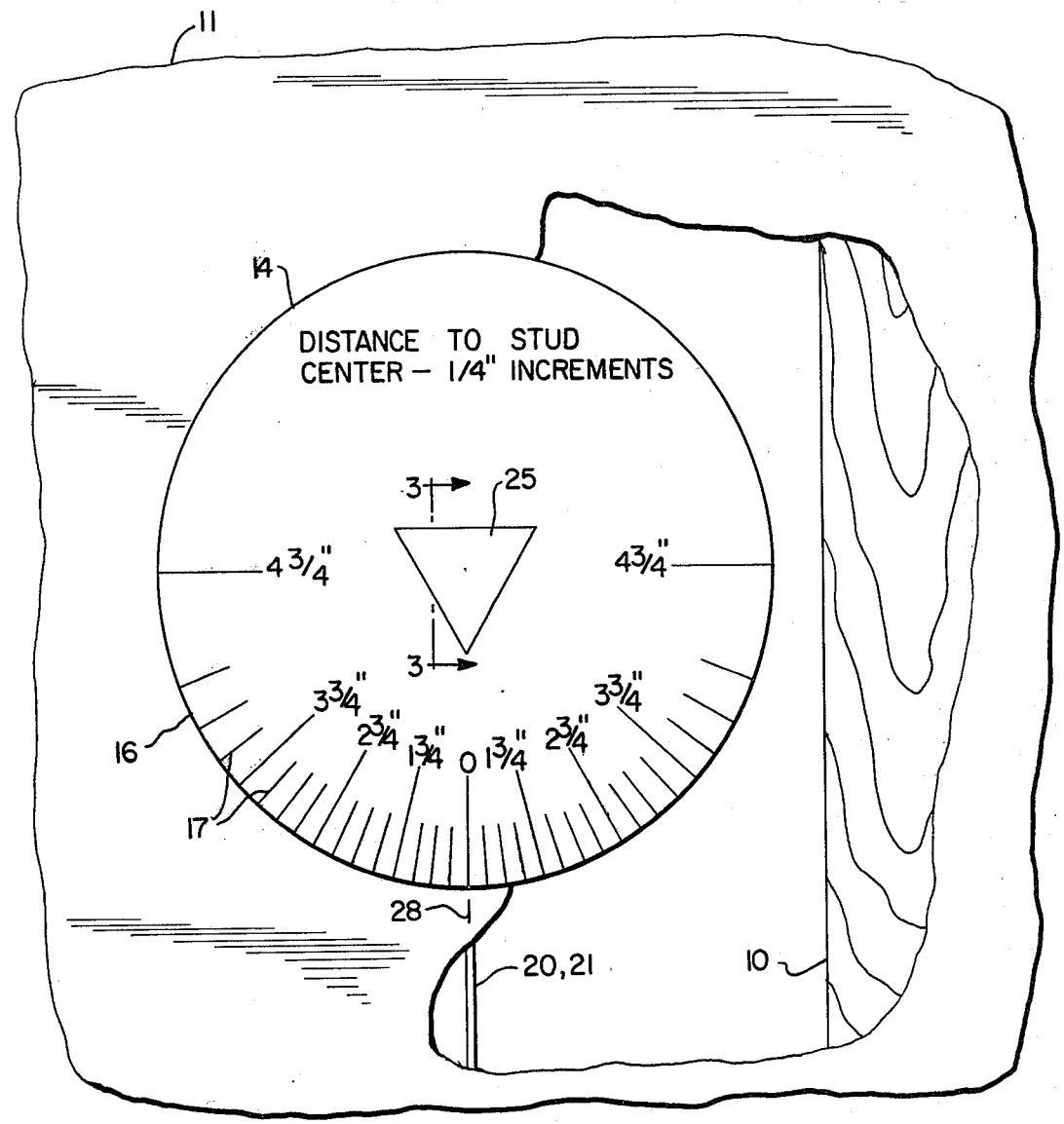
FIG. 1 is a fragmentary elevational view, partially cutaway, of a wall and stud showing a measuring apparatus in accordance with the invention thereon.

Referring now to the drawings in detail, and first to FIGS. 1-5 thereof, the apparatus is for use in a situation in which a structural member such as a stud 10 is concealed behind a sheet of facing material 11 which can be wallboard, paneling, plaster, or other material. The facing material 11 normally has a thickness of between about 0.25 inches and 0.75 inches. It will be assumed that there are no surface characteristics evidencing the location of stud 10, and that some device must be used to locate it.

The general vicinity of a stud can sometimes be determined by tapping the wall and noting the difference in sound between the hollow sound of that portion of the wallboard having no stud behind it and the more solid sound near the stud. Whether or not this technique can be used, it is necessary to make a small test hole 12 (FIGS. 3-5) using a nail or small drill. The apparatus of the prevent invention can then be employed.

The apparatus includes a surface plate 14 having a central opening 15 which, in the first embodiment illustrated, is triangular in shape. While the surface plate need not be entirely circular, at least a portion 16 thereof should have a circular periphery and is provided with a plurality of angularly spaced marks 17 on the front surface thereof, these marks being nonlinearly spaced in a manner which will be described.

The apparatus further includes a probe 20 which is bent to be generally L-shaped in configuration and having a longer leg 21, a shorter leg 22 and an intermediate portion 23, legs 21 and 22 being perpendicular to each other and portion 23 extending between the two legs at an angle of approximately 45°. Portion 23 can also be smoothly curved at a radius of approximately 0.75 inches or more. A coupling member 25 is fixedly attached to the distal end of the shorter leg and lies in a plane perpendicular thereto, coupling member 25 being also triangular in shape and dimensioned to be snugly received in opening 15. As will be seen in FIGS. 1, 2 and 5, probe 20 is mounted in coupling member 25 so that one corner of the triangle points in the same direction as the longer leg 21 of the probe.

Surface plate 14 and coupling member 25 can conveniently be made from any suitable material such as a polymeric material or metal, but a polymeric material is preferred. Probe 20 is preferably wire, but could also be molded from a polymeric material. It should be relatively stiff and smaller in diameter than the hole, the wire diameter preferably being in the order of 0.0625 inches. The thickness of the plate and coupling member can be in the order of one eighth to one quarter inch, although these dimensions are not regarded as being critical. Additionally, the total lateral extent of probe 20 should be on the order of four inches. This measurement is made from the central axis of leg 22 to the distal end of leg 21. The reason for selecting a four inch length is because the interior cavity in most walls, between the inner surfaces of the wallboard panels mounted on opposite sides of the studs is commonly in the order of 3.5 inches, and a probe longer than 4 inches could not conveniently be inserted.

Figure 5:
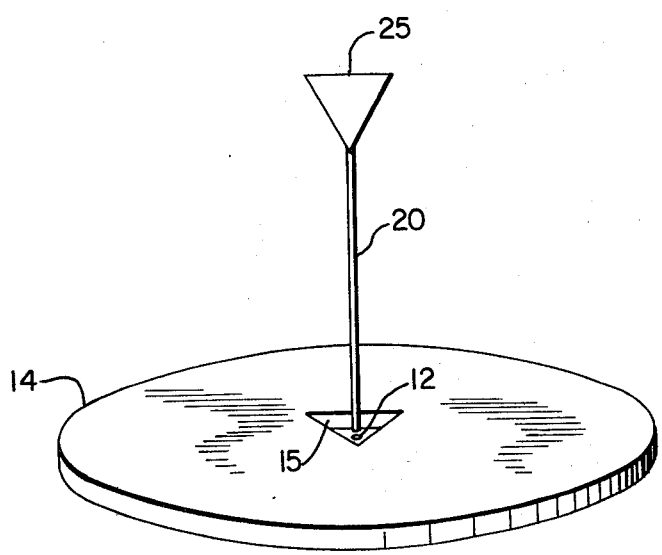
FIG. 5 is a simplified perspective view showing the manner of assembling the apparatus of FIGS. 1-4.

The apparatus is assembled as generally illustrated in FIG. 5 by placing plate 14 against the wall with opening 15 surrounding the test hole 12 which has been made in the wall. The probe 20 is then inserted through opening 15 and into hole 12 and the probe is turned so that it lies in the position illustrated in FIG. 4, with the longer leg extending generally parallel with the wallboard, and coupling member 25 is pressed into opening 15. The two portions 14 and 25 are then relatively nonrotatable, but the entire assembly can be rotated about the axis of shorter leg 22 which is substantially aligned with the axis of the test hole 12. It will be observed that, in the assembly process, the corner of the triangle which is aligned with the probe should be oriented toward the one of indicia 17 which is marked "0" in FIGS. 1 and 2.

Figure 2:
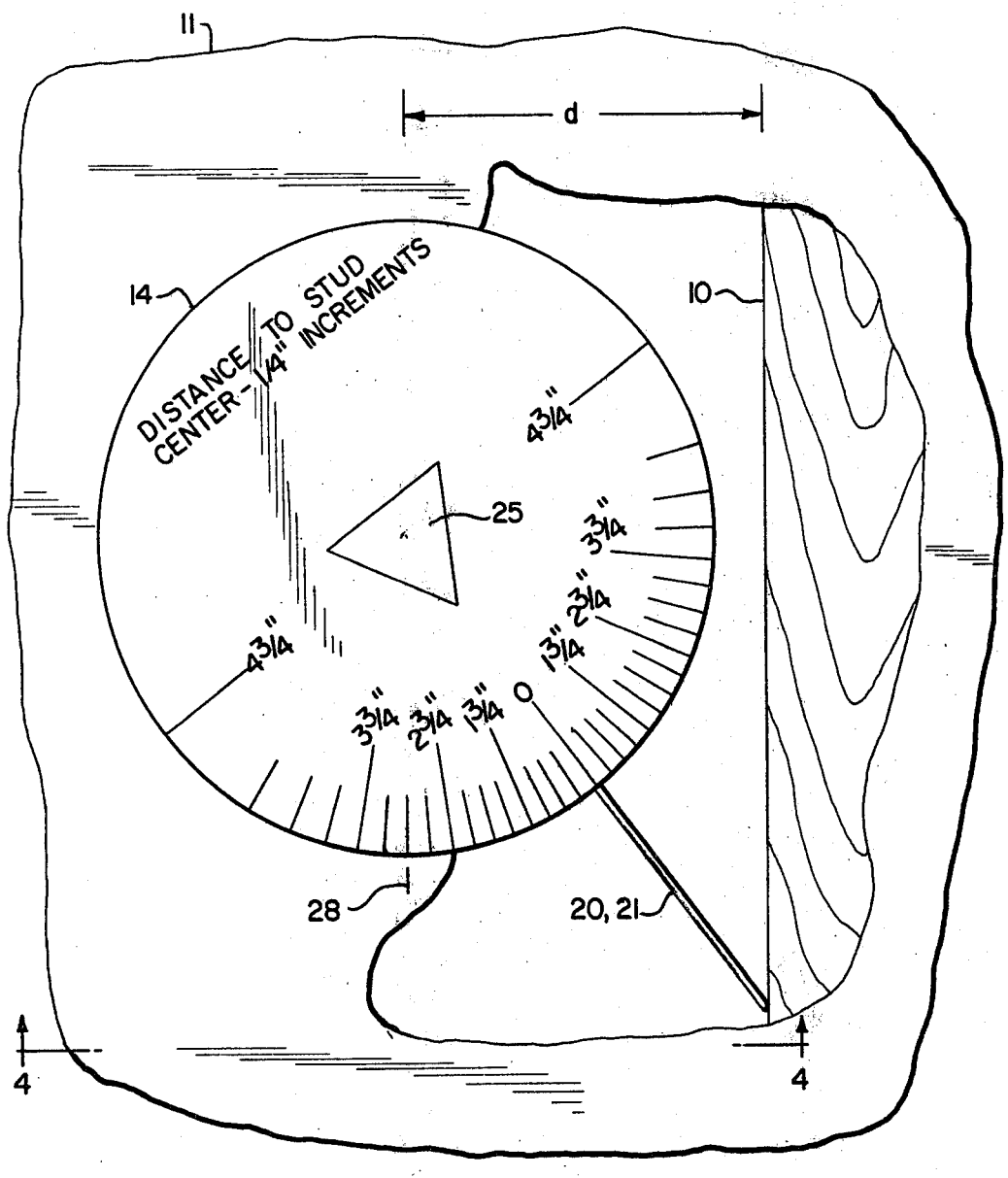
FIG. 2 is a view similar to FIG. 1 with the measuring apparatus in a second position.
Figure 3:
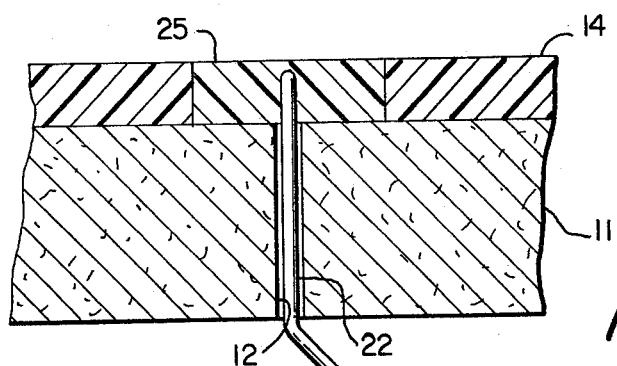
FIG. 3 is a sectional view along line 3—3 of FIG. 1.
Figure 4:
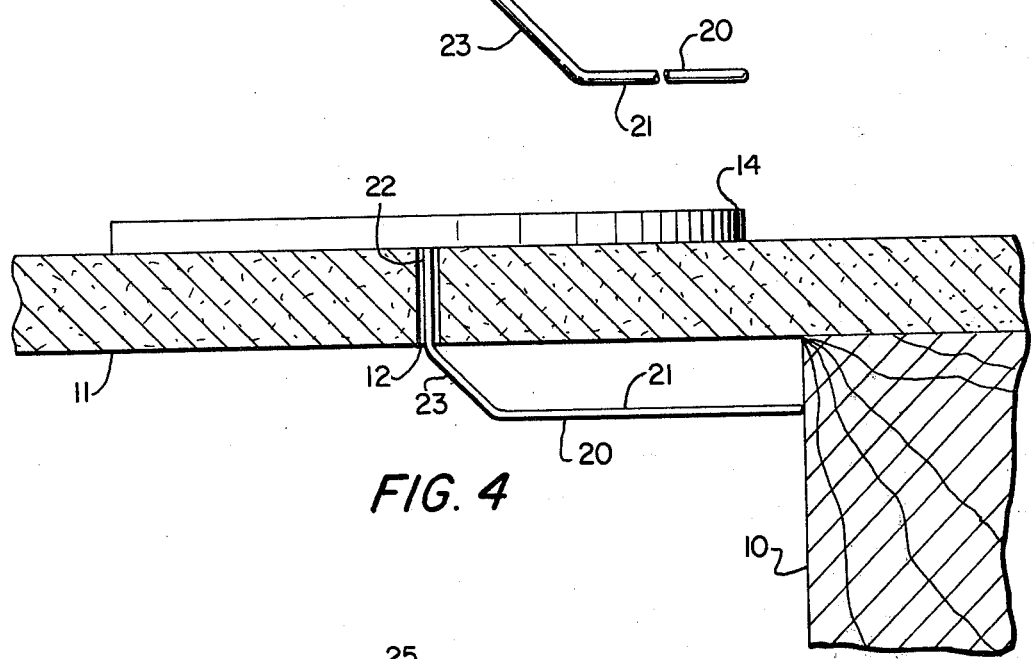
FIG. 4 is a sectional view along line 4—4 of FIG. 2.

The apparatus thus assembled is then allowed to orient itself, by gravity, in the position shown in FIG. 1 with the probe extending vertically and with the plate adjacent to and parallel with the wall surface. A small mark 28 is then made on the wall adjacent the "0" mark on the indicia on plate 14 to serve as a reference point. The plate, together with coupling member 25 and probe 20, are then rotated in either direction until the tip of the probe encounters a surface of stud 10. This position is shown in FIG. 2. As will be observed therein, mark 28 is adjacent a line lying midway between indicia labeled "2¾ inches" and "3¾ inches", indicating that the distance to the center of stud 10 is 3¼ inches from the test hole.

As will be recognized, the device disclosed herein operates on the principle of the solution of a right triangle of which the sides are the probe 20, the perpendicular distance between the starting position of probe 20 and the stud surface (the horizontal distance, in this example) and the vertical distance between the horizontal planes containing test hole 12 and the contact point of the distal end of leg 21 and the stud. The scale provided on plate 14, in conjunction with the reference mark 28, essentially measures the angle between the starting position (which is parallel with the vertical side of the triangle) and the probe in the position shown in FIG. 2 (the hypotenuse) which triangle can then be solved for the distance d illustrated in FIG. 2 so long as the probe length is accurately known.

Thus, the scale graduations forming indicia 17 are simply established on the basis of angles through which the probe must be rotated to reach a stud spaced from the test hole at various distances in, in the example shown, one quarter inch increments.

However, in order to indicate the distance to the center of the stud, an additional factor has been added. It is well known that most studs used in modern day construction have a thickness, in a direction parallel with the wallboard, of 1.5 inches. Thus, one half of that thickness has been added to each of the increments, thus providing a direct indication of the distance from the test hole to the center of the stud rather than to its closest surface.

For the sake of completeness, the following table is provided to indicate the angles at which graduations are placed to form indicia 17, giving one quarter inch increments.

TABLE I

| ANGLE FROM ZERO MARK | INDICATED DISTANCE |
|---|---|
| 3.5 degrees | 1.0 inches |
| 7.0 | 1.25 |
| 10.5 | 1.50 |
| 14.0 | 1.75 |
| 18.0 | 2.00 |
| 22.0 | 2.25 |
| 26.0 | 2.50 |
| 30.0 | 2.75 |
| 34.0 | 3.00 |
| 38.5 | 3.25 |
| 43.0 | 3.50 |
| 48.0 | 3.75 |
| 54.0 | 4.00 |
| 60.5 | 4.25 |
| 69.5 | 4.50 |
| 90.0 | 4.75 |

Figure 6:
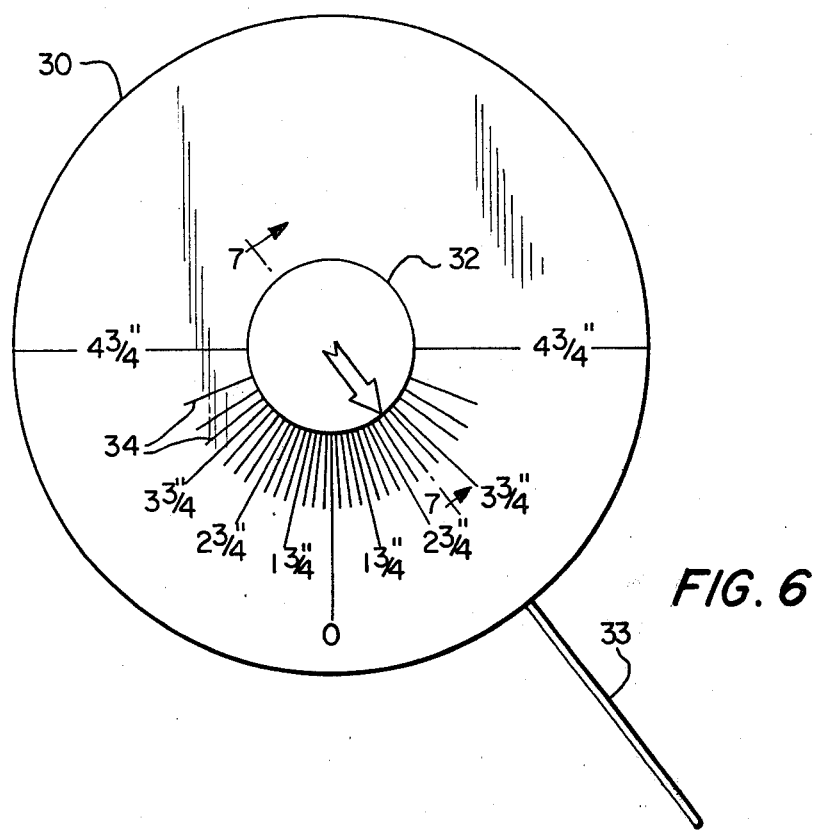
FIG. 6 is a plan view of a further embodiment of an apparatus in accordance with the invention.
Figure 7:
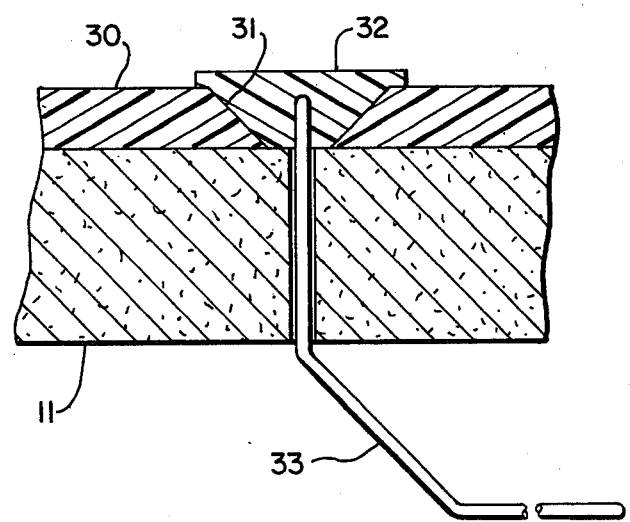
FIG. 7 is a sectional view along line 7—7 of FIG. 6.

A further embodiment of an apparatus employing the same principle of solving a triangle, and using the same principle for providing a scale, is shown in FIGS. 6 and 7. In that embodiment, a surface plate 30 is provided with a central opening 31 which is circular in plan but which, as shown in FIG. 7, is preferably frustoconical in section. A coupling member 32, also circular in plan and conical in side elevation to mate with opening 31, is provided with a probe 33, shaped in the same fashion as probe 20 and having its shorter leg centrally fixed in the coupling member. The surface of plate 30 is provided with indicia 34 which are angularly spaced in the same fashion as described in connection with FIGS. 1-5, but which radiate from opening 31 rather than being adjacent the outer periphery of the plate. Coupling member 32 carries an arrow 35 or similar marker aligned with the longer leg of probe 33. As will be recognized, coupling member 32 is rotatable relative to plate 30 after the two members have been assembled, permitting arrow 35 to move relative to indicia 34.

The manner of using the apparatus shown in FIGS. 6 and 7 is similar to that of the embodiment of FIGS. 1-5 initially in that the hole is formed, the plate 30 is placed so that opening 31 surrounds the hole, and the probe is then inserted through opening 31 and the hole and turned until coupling member 32 can be firmly seated in opening 31. Arrow 35 is then aligned with the "0" marker of indicia 34, and the structure is allowed to assume a starting position in which probe 33 extends in a vertical plane, by gravity.

From this point, the operation differs in that plate 30 is held with one hand while coupling member 32 is rotated with the other hand until the end of probe 33 contacts the stud. This is the position illustrated in FIG. 6, and it will again be seen that the arrow points to an indicia indicating a distance from the test hole to the center of the stud of 3¼ inches. As previously indicated, the principle of operation is fundamentally the same, the embodiment of FIGS. 6 and 7 requiring no mark on the wall.

While certain advantageous embodiments have been chosen to illustrate the invention it will be understood by those skilled in the art that various changes and modifications can be made therein without departing from the scope of the invention as defined in the appended claims.

What is claimed is:

1. An apparatus for measuring and displaying the distance between a concealed structural member and a hole through a planar panel adjacent to and concealing the structural member, comprising
    a surface plate having an opening therethrough alignable with the hole when said plate is placed against the panel;
    an elongated, generally L-shaped probe member having one leg of fixed length significantly longer than the other leg and a diameter smaller than the hole, said longer leg being insertable through said opening in said surface plate and through the hole and being turnable until the shorter leg is substantially coaxial with the hole and said longer leg is generally parallel with the panel;
    means attached to the distal end of said shorter leg for permitting manipulation of said probe member from the front of said plate;
    indicia on said surface plate for indicating the amount of angular sweep of said longer leg while said longer leg remains generally parallel with the panel from a starting position to a position in which the distal end of said longer leg contacts said structural member; and
    index means on said probe member for rotationally orienting said probe member relative to said indicia.

2. An apparatus according to claim 1 wherein said surface plate includes calibrations associated with said indicia for displaying a quantity proportional to the linear component of distance traveled by the end of said longer leg in a direction perpendicular to the plane containing the starting position of said probe.

3. An apparatus according to claim 2 wherein said longer leg of said probe is vertical in said starting position and the linear component is the horizontal distance between said hole and said member.

4. An apparatus according to claim 2 wherein said longer leg of said probe is vertical in said starting position and the linear component displayed is the horizontal distance between said hole and the contacted surface of said structural member plus one-half of the width of standard structural members of the type of said member.

5. An apparatus according to claim 1 wherein said opening and said coupling member are polygonal in shape and a corner of said coupling member is aligned with the longer leg of said probe.

6. An apparatus according to claim 5 wherein said surface plate has a circular peripheral portion centered at the center of said opening therethrough, and wherein said indicia are angularly spaced along said circular portion.

7. An apparatus according to claim 1 wherein said opening in said surface plate and said coupling member are circular in shape, said coupling member being rotatable in said opening when received in said opening, said shorter leg being centrally located in said coupling member.

8. An apparatus according to claim 7 wherein said indicia are angularly spaced adjacent said opening and said coupling member is provided with a mark aligned with the longer leg of said probe for indicating, with said indicia, the angular position of said probe relative thereto.

9. An apparatus according to claim 1 wherein said means attached to the distal end of said shorter leg comprises a coupling member shaped to be received in the opening in said surface plate.

* * * * *